US011573149B2

(12) United States Patent
Gupte et al.

(10) Patent No.: US 11,573,149 B2
(45) Date of Patent: Feb. 7, 2023

(54) SYSTEMS AND METHODS FOR REFRIGERANT LEAK MANAGEMENT BASED ON ACOUSTIC LEAK DETECTION

(71) Applicant: Johnson Controls Technology Company, Auburn Hills, MI (US)

(72) Inventors: Neelkanth Gupte, Katy, TX (US); Jay C. Walser, Norman, OK (US); James C. Perkins, Oklahoma City, OK (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 929 days.

(21) Appl. No.: 15/871,682

(22) Filed: Jan. 15, 2018

(65) Prior Publication Data

US 2019/0170603 A1 Jun. 6, 2019

Related U.S. Application Data

(60) Provisional application No. 62/593,594, filed on Dec. 1, 2017.

(51) Int. Cl.
*G01M 3/24* (2006.01)
*G01M 3/16* (2006.01)
*F25B 49/00* (2006.01)

(52) U.S. Cl.
CPC ............ *G01M 3/24* (2013.01); *F25B 49/005* (2013.01); *G01M 3/16* (2013.01); *F25B 2500/222* (2013.01); *F25B 2700/00* (2013.01)

(58) Field of Classification Search
CPC ............ F25B 2500/22; F25B 2500/221; F25B 2500/23; F25B 2500/24; F25B 2500/32; F25B 2500/222; G01M 3/007; G01M 3/207

See application file for complete search history.

(56) References Cited

U.S. PATENT DOCUMENTS

| 7,051,577 | B2 | 5/2006 | Komninos |
| 7,318,335 | B2 | 1/2008 | Olesen et al. |
| 9,091,613 | B2 | 7/2015 | Baliga |
| 2001/0045129 | A1* | 11/2001 | Williams ................. G01M 3/24 73/592 |
| 2012/0007743 | A1* | 1/2012 | Solomon ............. G01M 3/2807 702/51 |
| 2012/0007744 | A1* | 1/2012 | Pal ......................... G01M 3/243 702/51 |
| 2012/0291457 | A1* | 11/2012 | Brown .................... F25B 45/00 62/77 |
| 2013/0036796 | A1* | 2/2013 | Fleury, Jr. ............... H01Q 1/38 73/40.5 R |

(Continued)

*Primary Examiner* — Nelson J Nieves
*Assistant Examiner* — Meraj A Shaikh
(74) *Attorney, Agent, or Firm* — Fletcher Yoder, P.C.

(57) ABSTRACT

A refrigerant leak management system for a heating, ventilating, and air conditioning (HVAC) system is disclosed. The system includes a controller communicatively coupled to one or more sensors disposed within the HVAC system. The controller measures a vibration pattern associated with a component of the HVAC system. The controller determines whether the vibration pattern is indicative of a refrigerant leak in the HVAC system. Additionally, the controller can modify operation of the HVAC system when the vibration pattern is indicative of the refrigerant leak in the HVAC system.

28 Claims, 8 Drawing Sheets

(56) References Cited

U.S. PATENT DOCUMENTS

| | | | |
|---|---|---|---|
| 2016/0153678 A1* | 6/2016 | Papas | A62C 4/02 |
| | | | 62/331 |
| 2016/0305235 A1 | 10/2016 | Hull et al. | |
| 2017/0016797 A1* | 1/2017 | Park | G01N 29/4472 |
| 2017/0370605 A1* | 12/2017 | Makino | F24F 11/77 |
| 2018/0073762 A1* | 3/2018 | Yajima | F24F 11/89 |
| 2019/0024931 A1* | 1/2019 | Suzuki | F24F 11/74 |
| 2019/0154539 A1* | 5/2019 | Banerjee | G01M 3/2807 |

\* cited by examiner

SYSTEMS AND METHODS FOR REFRIGERANT LEAK MANAGEMENT BASED ON ACOUSTIC LEAK DETECTION

CROSS-REFERENCE TO RELATED APPLICATION

This application is a Non-Provisional application claiming priority to U.S. Provisional Application No. 62/593,594, entitled "SYSTEMS AND METHODS FOR REFRIGERANT LEAK MANAGEMENT BASED ON ACOUSTIC LEAK DETECTION," filed Dec. 1, 2017, which is hereby incorporated by reference in its entirety for all purposes.

BACKGROUND

The present disclosure relates generally to heating, ventilating, and air conditioning (HVAC) systems, and more particularly to systems and methods for refrigerant leak management based on acoustic leak detection in HVAC systems.

Residential, light commercial, commercial, and industrial HVAC systems are used to control temperatures and air quality in residences and buildings. Generally, the HVAC systems may circulate a refrigerant through a closed refrigeration circuit between an evaporator, where the refrigerant absorbs heat, and a condenser, where the refrigerant releases heat. The refrigerant flowing within the circuit is generally formulated to undergo phase changes within the normal operating temperatures and pressures of the system so that quantities of heat can be exchanged by virtue of the latent heat of vaporization of the refrigerant. As such, the refrigerant flowing within a HVAC system travels through multiple conduits and components of the circuit. Inasmuch as refrigerant leaks compromise system performance or result in increased costs, it is accordingly desirable to provide detection and response systems and methods for the HVAC system to reliably detect and respond to any refrigerant leaks of the HVAC system.

SUMMARY

In one embodiment of the present disclosure, a refrigerant leak management system includes a controller communicatively coupled to a sensor disposed within a heating, ventilation, and air conditioning (HVAC) system. The controller is configured to measure a vibration pattern associated with a component of the HVAC system using the sensor. The controller is also configured to determine whether the vibration pattern is indicative of a refrigerant leak in the HVAC system. Additionally, the controller is configured to modify operation of the HVAC system when the pattern is indicative of the refrigerant leak in the HVAC system.

In another embodiment of the present disclosure, a refrigerant leak management system of a heating, ventilation, and air conditioning (HVAC) system includes a sensor disposed near an evaporator of the HVAC system and configured to detect a vibration pattern associated with the evaporator. The refrigerant leak management system also includes a controller communicatively coupled to the sensor and configured to receive a signal from the sensor indicative of the vibration pattern associated with the evaporator. The controller is configured to determine whether the vibration pattern is indicative of a refrigerant leak from the evaporator. Additionally, the controller is configured to modify operation of the HVAC system when the vibration pattern is indicative of the refrigerant leak from the evaporator.

In a further embodiment of the present disclosure, a method of operating a refrigerant leak management system of a heating, ventilation, and air conditioning (HVAC) system includes measuring a plurality of vibration patterns associated with the HVAC system using a plurality of sensors disposed near a refrigeration circuit of the HVAC system. The method includes determining whether a vibration pattern of the plurality of vibration patterns is indicative of a refrigerant leak from the refrigeration circuit. Additionally, the method includes modifying operation of the HVAC system when the vibration pattern is indicative of the refrigerant leak from the refrigeration circuit of the HVAC system.

Other features and advantages of the present application will be apparent from the following, more detailed description of the embodiments, taken in conjunction with the accompanying drawings which illustrate, by way of example, the principles of the application.

DETAILED DESCRIPTION

As discussed above, a HVAC system generally includes a refrigerant flowing within a closed refrigeration circuit. However, the refrigerant may inadvertently leak from a flow path of the refrigeration circuit due to wear or degradation to components, or imperfect joints or connections within the circuit, at some point after installation. If undetected, leaking refrigerant may compromise system performance or result in increased costs. As such, present techniques enable HVAC systems to reliably detect and manage refrigerant leaks.

The present disclosure recognizes that leaks of refrigerant can be acoustically detected based on a characteristic frequency or vibration pattern that the leaking refrigerant produces. For example, if leaking from a high pressure side of the closed refrigeration circuit that includes the evaporator and compressor, the leaking refrigerant may produce a high-frequency signal, such as a high pitch whine or whistle. Additionally, if leaking from an opening or hole in a component of the HVAC system such as an evaporator, the leaking refrigerant may cause the component, and potentially other nearby components of the HVAC system, to vibrate in a distinct, detectable manner.

With the foregoing in mind, present embodiments are directed to a leak management system having a controller that is communicatively coupled to one or more vibration sensors. For example, these vibration sensors include acoustic wave detectors or sound wave detectors, such as microphones and/or accelerometers respectively disposed on or nearby certain components of the HVAC system. The vibration sensors measure various vibrations traversing these HVAC components and/or traversing the air near these HVAC components, including vibrations that are indicative of normal HVAC operation and vibrations that are indicative of refrigerant leak. The controller may access a vibration pattern database storing predetermined vibration patterns associated with different refrigerant leaks to determine whether measured vibrations are indicative of a refrigerant leak. Additionally, in certain embodiments, the controller operates the leak management system in various modes, including idle mode, active detection mode, and leak response mode, and coordinates operation of the leak management system with the remainder of the HVAC system. In this manner, the disclosed techniques enable acoustic detection of a leaking refrigerant, and enable response via any combination of suitable control actions to block or prevent the leaked refrigerant from reaching a threshold concentration for the particular refrigerant within the HVAC system or within an interior space of a building conditioned by the HVAC system.

Figure 1:
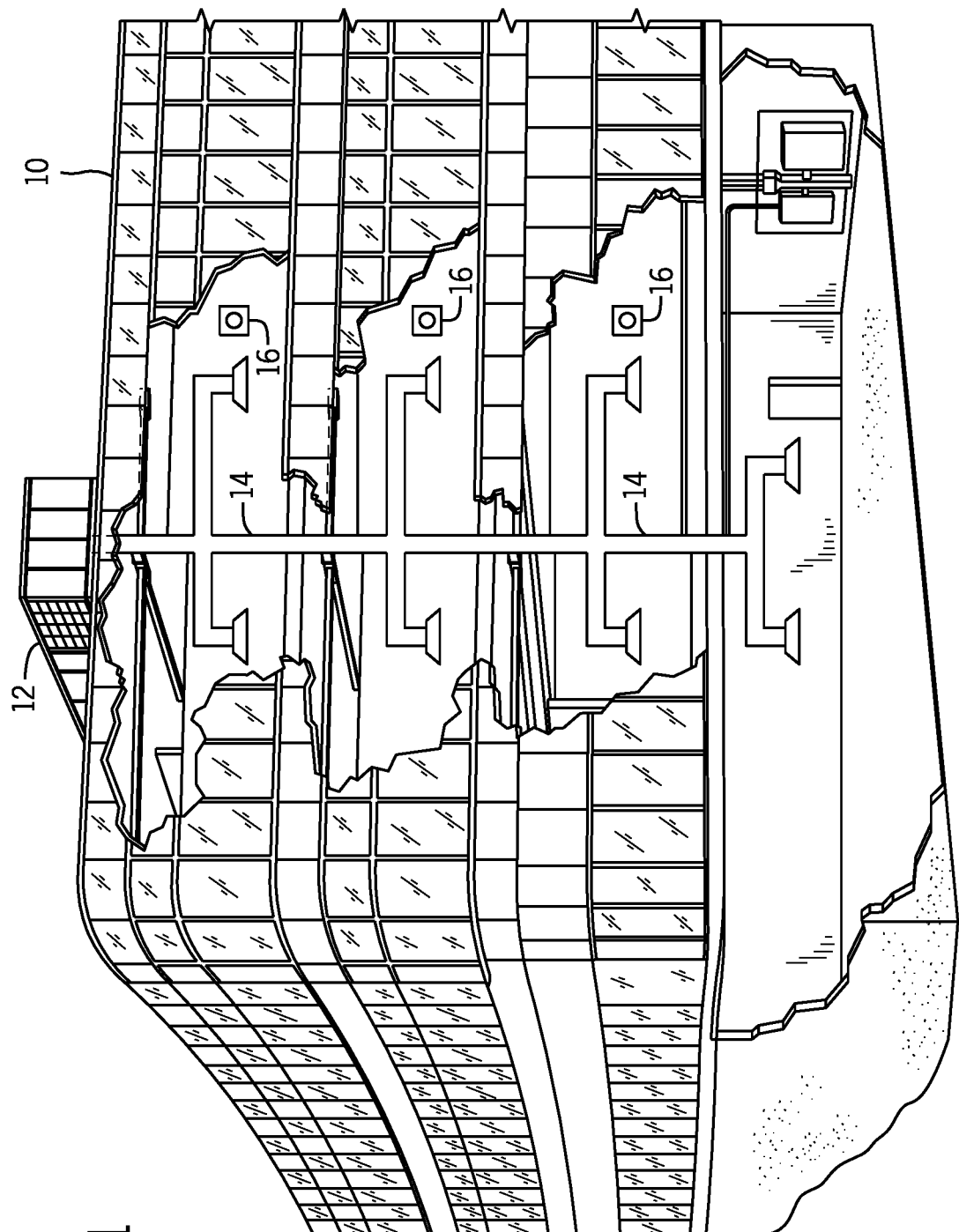
FIG. 1 is an illustration of an embodiment of a commercial or industrial HVAC system, in accordance with present techniques.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
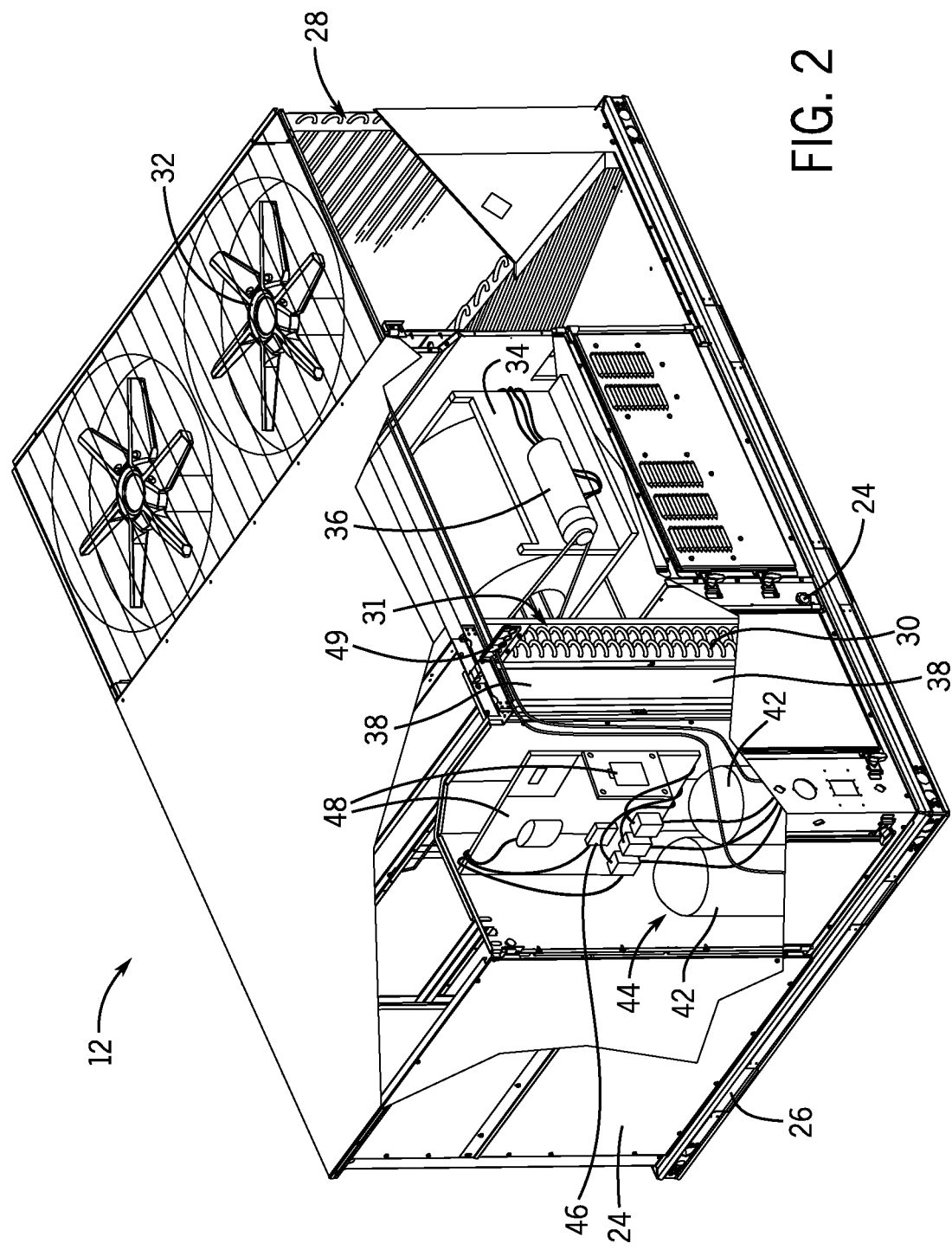
FIG. 2 is an illustration of an embodiment of a packaged unit of the HVAC system, in accordance with present techniques.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
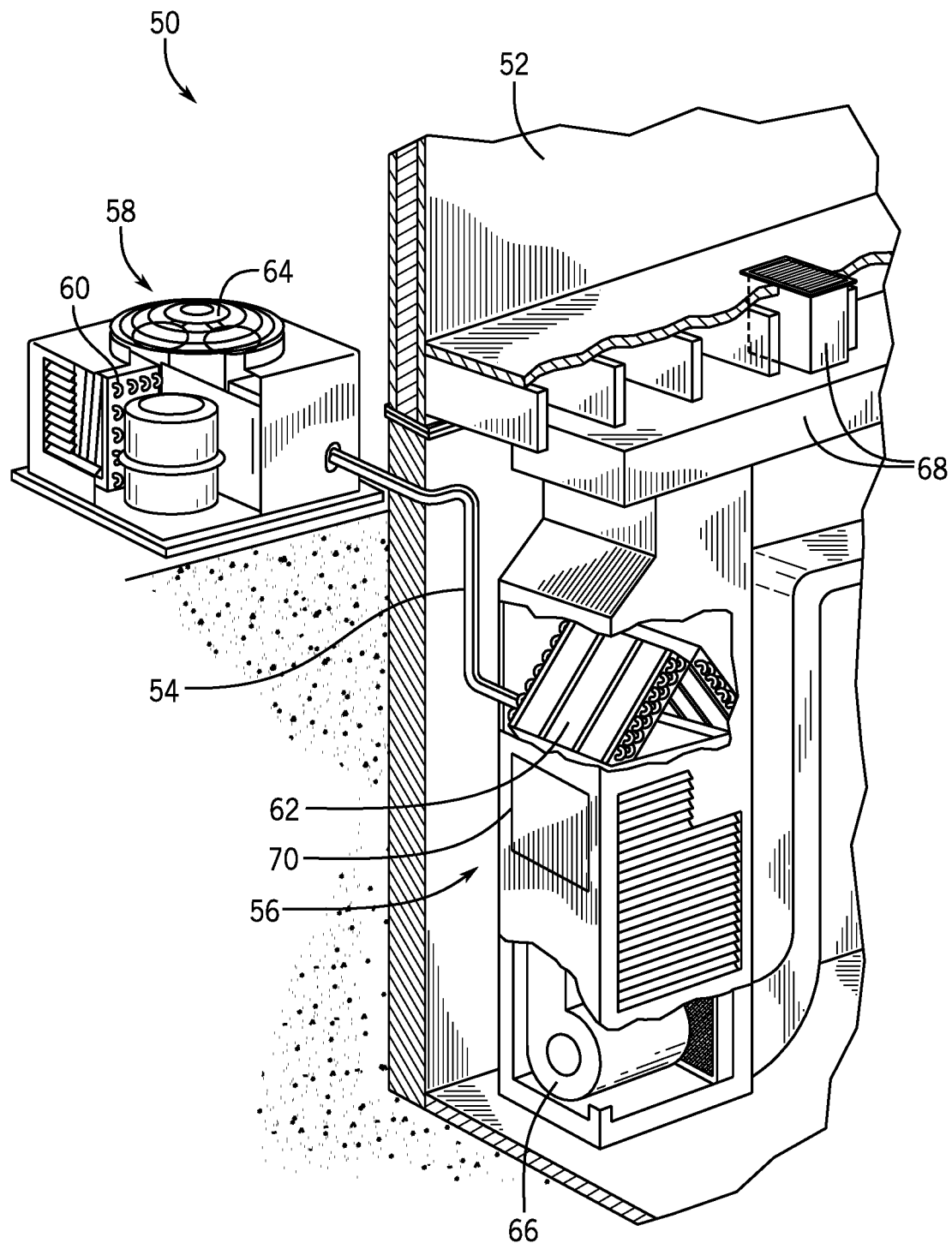
FIG. 3 is an illustration of an embodiment of a split-type HVAC system, in accordance with present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger that is separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
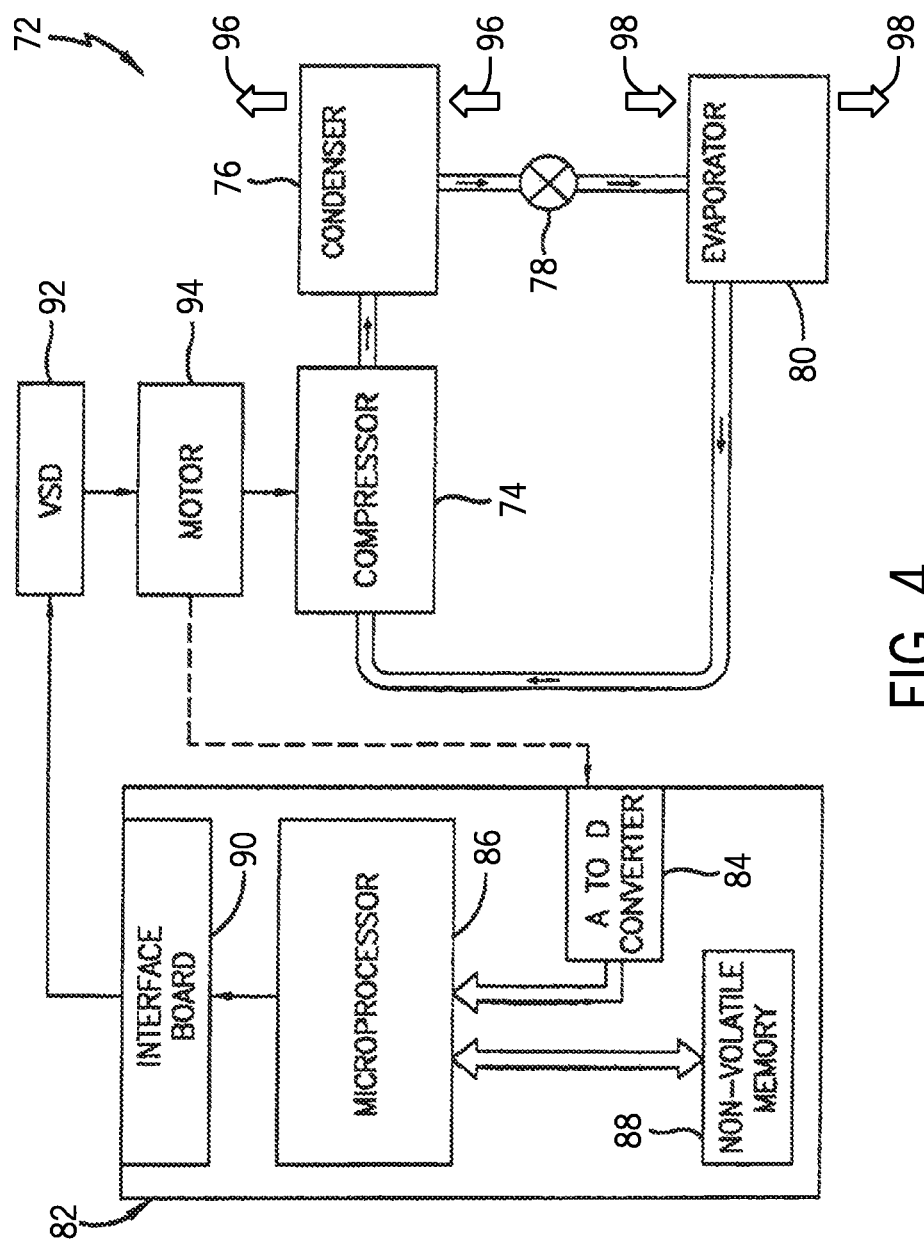
FIG. 4 is a schematic diagram of an embodiment of a refrigeration system of the HVAC system, in accordance with present techniques.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
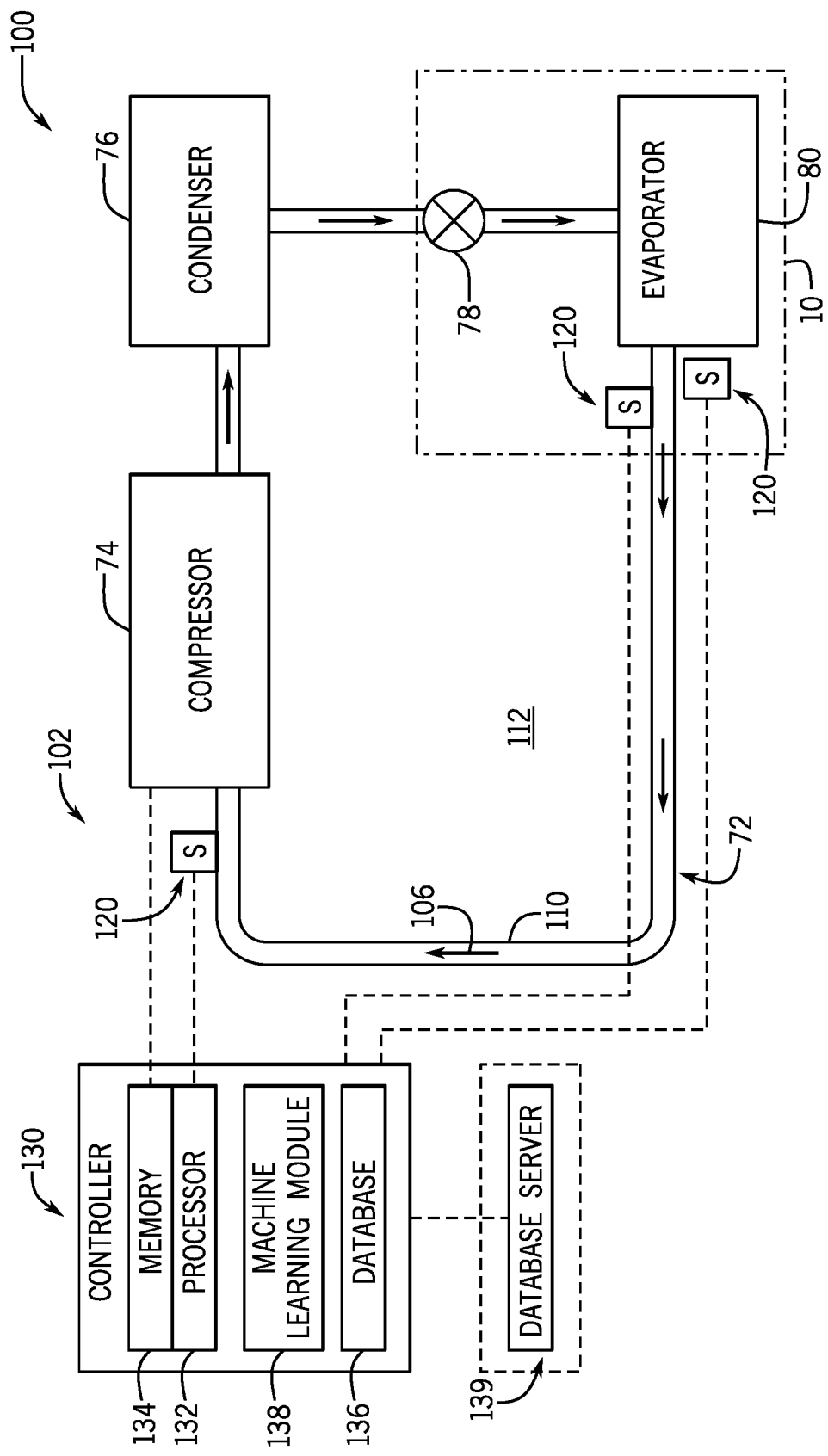
FIG. 5 is a schematic diagram of an embodiment of a leak management system of the HVAC system, in accordance with present techniques.

FIG. 5 is a schematic diagram of a HVAC system 100 having a leak management system 102 for detecting and controlling a leak of refrigerant from the vapor compression system 72, also referred to herein as refrigeration circuit 72. As shown, the refrigeration circuit 72 of the HVAC system 100 includes refrigeration circuit 72, which includes the compressor 74, the condenser 76, the expansion device 78, and the evaporator 80 discussed above. The compressor 74 moves or drives a refrigerant 106 along conduits 110 that fluidly couple the compressor 74, the condenser 76, the expansion device 78, and the evaporator 80. The refrigerant 106 may be any desired refrigerant, such as R32, R1234ze, R1234yf, R-454A, R-454C, R-455A, R-447A, R-452B, R-454B, and the like. As will be discussed in more detail below, the leak management system 102 may detect a leak of the refrigerant 106 into an exterior environment 112 outside of the refrigeration circuit 72, and perform suitable control actions to mitigate the leak of the refrigerant 106. As used herein "exterior environment" refers to any volume or location that is outside of the refrigeration circuit 72. As such, it may be appreciated that the exterior environment 112 may include a portion of an interior volume of the HVAC system 100 and/or the building 10.

Moreover, the illustrated embodiment of the HVAC system 100 conditions a building 10, such as the residence 52 discussed above, by providing conditioned air to an interior of the building 10. As shown, the expansion device 78 and the evaporator 80 are located or positioned within the building 10 and the compressor 74 and the condenser 76 are located or positioned outside of the building 10. For example, the expansion device 78 and the evaporator may be part of the indoor HVAC unit 56, while the compressor 74 and the condenser 76 may be part of the outdoor HVAC unit 58 of the residential heating and cooling system 50 discussed above. As such, the present embodiment of the leak management system 102 includes leak detection and leak management devices that advantageously detect leaks of the refrigerant 106 into the exterior environment 112 to prevent and/or mitigate the concentration of the leaked refrigerant from accumulating to reach a threshold concentration.

The present disclosure recognizes that certain vibrations are emitted from and/or through components of the HVAC system 100 in response to the refrigerant 106 leaking from the refrigeration circuit 72 through which the refrigerant 106 flows. As discussed herein, "vibrations" are intended to cover all types of vibrations and sound, including macroscopic vibrations, microscopic vibrations, ultrasound, and infrasound, such as vibrations through buildings, vibrations through air or fluids, pressure waves, and the like. In certain conditions, an opening or hole is formed through a component of the HVAC system 100 due to wear, corrosion, punctures, or other degradation to the HVAC system 100. Because the refrigeration circuit 72 is pressurized relative to the exterior environment 112 or pressurized above atmospheric pressure, the refrigerant 106 escapes the refrigeration circuit 72 of the HVAC system 100 through the opening. In situations in which the opening is small, such as when the opening has a dimension or diameter less than a size threshold, the refrigerant 106 rushes through the opening, thus vibrating nearby air and components with a certain signature, range, span, collection, and/or pattern of vibration frequencies.

As used herein, a "vibration pattern" refers to the certain signatures of vibration frequencies, which are associated with various parameters of the refrigerant 106 and the respective opening that the refrigerant 106 may be leaking from. For example, a vibration pattern may be detected as a whistling, humming, or rumbling, depending on the pressure, temperature, flowrate, and/or composition etc. of the respective refrigerant, and depending on the size of the opening. In certain conditions, an average frequency of the vibration pattern for leaks from a high-pressure side of the HVAC system 100 is higher than an average frequency of the vibration pattern for leaks from a low-pressure side of the HVAC system 100. In some embodiments, the high-pressure side of the HVAC system 100 is defined between an inlet of the condenser 76 and an inlet of the expansion device 78, and the low-pressure side of the HVAC system 100 is defined between an orifice of the expansion device 78 through the evaporator 80 and the compressor 74 to the inlet of the condenser 76. Additionally, an average frequency of the vibration pattern for leaks from smaller openings may be higher than an average frequency of the vibration pattern for leaks from larger openings. Thus, the present disclosure recognizes that the vibrations produced by the HVAC system 100 may be detected and processed to determine whether a vibration pattern indicative of a refrigerant leak is present.

As such, the present embodiment of the leak management system 102 in FIG. 5 includes vibration sensors 120 near or within a sensing range of components of the HVAC system 100 to detect vibrations therefrom and therethrough. The vibration sensors 120 may be any suitable sensors capable of detecting vibrations and/or sounds, such as an electric microphones, acoustic sensors, or accelerometers. In certain embodiments, a vibration sensor 120 is disposed on an inner or outer surface of a component, such as the illustrated conduit 110 or evaporator 80, to enable detection of the vibrations therethrough. Additionally, in certain embodiments, a vibration sensor 120 is disposed proximate to the component to enable the vibration sensor to detect sounds or vibrations emanating from the component and traveling through nearby air or fluid. Moreover, as discussed in greater detail with reference to FIG. 6 below, a portion of the vibration sensors 120 may be accelerometers that detect macroscopic vibrations, while another portion of the vibration sensors 120 may be electric microphones to detect microscopic vibrations, including sounds. Indeed, any suitable combination of vibration sensors 120 may be employed in accordance with the techniques disclosed herein to enable detection of vibrations indicative of refrigerant leaks from the refrigeration circuit 72 of the HVAC system 100.

In the embodiment illustrated in FIG. 5, the leak management system 102 includes a controller 130 to control operations of the leak management system 102. The controller 130 is communicatively coupled to the vibration sensors 120 to enable detection and management of leaks of the refrigerant 106. As such, the controller 130 transmits control signals to and receives sensor signals from the vibration sensors 120. Additionally, for the illustrated embodiment, the controller 130 is the HVAC controller that governs operation of the entire HVAC system 100, including the compressor 74, the supply fan, etc., in addition to the leak management system 102. The controller 130 may include a distributed control system (DCS) or any computer-based workstation. For example, the controller 130 can be any device employing a general purpose or an application-specific processor 132, both of which may generally include memory 134 or suitable memory circuitry for storing instructions and/or data. However, in certain embodiments, the controller 130 may be a separate controller for controlling the leak management system 102 that is communicatively coupled to exchange data and/or instructions with a HVAC controller or another suitable master controller.

The processor 132 illustrated in FIG. 5 may include one or more processing devices, and the memory 134 may include one or more tangible, non-transitory, machine-readable media collectively storing instructions executable by the processor 132 to control the leak management system 102 and/or the HVAC system 100. The controller 130 provides control signals to operate the leak management system 102 and the HVAC system 100 to perform the control actions disclosed herein. More specifically, as discussed below, the controller 130 receives input signals from various components of the HVAC system 100 and outputs control signals to control and communicate with various components in the HVAC system 100. As such, the controller 130 may provide suitable control signals to control the flowrates, motor speeds, and valve positions, among other parameters, of the HVAC system 100.

Moreover, although the controller 130 has been described as having the processor 132 and the memory 134, it should be noted that in certain embodiments, the controller 130 is the control panel 82 of FIG. 4, such that the processor 132 is the microprocessor 86, and the memory 134 is the non-volatile memory, as illustrated in FIG. 4. Additionally, in certain embodiments, the controller 130 includes or is communicatively coupled to a number of other computer system components to enable the controller 130 to control the operations of the HVAC system 100 and the related components. For example, the controller 130 may include a communication component that enables the controller 130 to communicate with other computing systems and electronic devices, including alarm systems. The controller 130 may also include an input/output component that enables the controller 130 to interface with users via a graphical user interface or the like. In addition, the communication between the controller 130 and other components of HVAC system 100 may be via a wireless connection, such as through Bluetooth® Low Energy, ZigBee®, WiFi®, or may be via a wired connection, such as through Ethernet. In some embodiments, the controller 130 may include a laptop, a smartphone, a tablet, a personal computer, a human-machine interface, or the like. Additionally, the embodiments disclosed herein may be at least partially embodied using hardware implementations. For example, logic elements of the controller 130 may include a field-programmable gate array (FPGA), or other specific circuitry.

Further, as illustrated, the controller 130 includes a vibration pattern database or refrigerant leak database, referred to hereinafter as a database 136. In some embodiments, the database 136 is stored in the memory 134. Additionally, in some embodiments, the controller 130 does not include the database 136 stored thereon, and instead is capable of communicatively coupling to a database server 139 having a processor and memory for performing the database related operations discussed herein. For example, in certain embodiments, the database 136 or the database server 139 includes data or information regarding various refrigerant leaks and their characteristic vibration patterns, as well data or information regarding vibration patterns that are not characteristic of refrigerant leaks. In particular, the database 136 may store a body or corpus of data that is used to train a machine learning module 138 of the database 136, as discussed below. That is, the database 136 may include data entries indicative of vibrational patterns associated with particular refrigerant leaks, such as data entries associated with various locations and sizes of leaks and/or leaks associated with particular refrigerant properties, as well as data entries indicative of vibrational patterns associated with normal operation of the HVAC system 100 and/or the exterior environment 112.

For example, in certain embodiments, the database 136 may be populated experimentally and subsequently used to train the controller 130 at the time of manufacturing. That is, prior to manufacturing the HVAC system 100, a service technician or lab operator may construct and operate a test HVAC system similar to the HVAC system 100 being manufactured to collect vibration patterns in and around various portions of the test HVAC system during operation. This includes vibration patterns collected during normal, non-leaking OFF-cycle, and/or ON-cycle operation of the test HVAC system, as well as vibration patterns associated with the exterior environment. The vibration patterns associated with the exterior environment may include, for example, vibration patterns indicative of airplanes, trains, cars, wildlife, human activities, precipitation, etc. Further, the technicians may intentionally generate various refrigerant leaks in the test HVAC system and record a resulting vibration pattern that is indicative of the refrigerant leak. In such conditions, the service technicians may vary one parameter per experiment, while maintaining the other parameters constant. In certain embodiments, the varied parameters include types of refrigerant, refrigerant charge, physical properties of the leaking refrigerant including pressures, temperatures, flowrates, and compositions, atmospheric conditions including air temperatures and barometric pressures, types of leaking components including conduits, evaporators, condensers, etc., size and shape of various openings of the leak, etc. Thus, the service technicians can collect data that indicates one or more vibration patterns associated with numerous combinations of parameters of the test HVAC system. Additionally, a suitable processor, such as the processor 132 or another computing device associated with the service technicians, may be employed to extrapolate or interpolate the test data to extend the data to cover other sets of parameters that were not experimentally collected.

The controller 130 of the illustrated embodiment includes the machine learning module 138 mentioned above, which may be implemented in the form of hardware such as electronic circuitry communicatively coupled to the processor 132, software such as instructions executable by the processor 132, or a combination thereof. The machine learning module 138 is capable of being trained to differentiate vibration patterns that are associated with normal operation of the HVAC system 100 and/or associated with the exterior environment 112 from vibration patterns associated with a refrigerant leak. That is, in certain embodiments, the controller 130 may temporarily be communicatively coupled to the database 136 during manufacturing, such that the machine learning module 138 of the controller 130 is capable of accessing, querying, searching, and/or retrieving the data stored in the database 136 for training. In certain embodiments, the machine learning module 138 may access particular portions of the database 136, for example, based on a particular set of parameters that correspond to the HVAC system 100 being manufactured.

The machine learning module 138 may include any suitable artificial intelligence element, such as a neural network, suitable for training with the data of the database 136. In certain embodiments, once training is complete, the machine learning module 138 of the controller 130 may be communicatively uncoupled from the database 136, and the controller 130 with the trained machine learning module 138 may be used to manufacture the HVAC system 100, as illustrated in FIG. 5. Accordingly, within the illustrated embodiment of the HVAC system 100, the machine learning module 138 of the controller 130 is trained or otherwise internally programmed to receive vibration signals from vibration sensors 120 disposed throughout the HVAC system 100 and, in response, output a value that is representative of a probability that the one or more vibration signals are indicative of a refrigerant leak occurring. In some embodiments, the value output from the machine learning module 138 is a real number between zero and one. In other embodiments, the controller 130 may lack the machine learning module 138 and may instead store the database 136 in the memory 134. For such embodiments, the controller 130 can query the database 136 in the memory 134 and compare vibration signals received from vibration sensors 120 in order to differentiate vibration patterns associated with a refrigerant leaks from those associated with background vibrations.

Looking now to the operation of the HVAC system 100 and the leak management system 102, it is to be understood that the leak management system 102 is generally capable of switching between various operating modes. In certain embodiments, these modes may include an idle mode, an active detection mode, and a leak response mode. In general, the operating modes of the leak management system 102 are coordinated with the operation of the HVAC system 100. For example, the HVAC system 100 is capable of switching through an ON-cycle in which the compressor 74 motivates the refrigerant 106 within the refrigeration circuit 72 to condition the interior space, and an OFF-cycle in which the compressor 74 does not motivate the refrigerant 106 through the refrigeration circuit 72.

It is presently recognized that, when the HVAC system 100 is in the ON-cycle, the operation of the compressor 74, the operation of fans 64 and 66 respectively associated with the condenser 76 and evaporator 80, the movement of the refrigerant 106 through the refrigeration circuit 72, and combinations thereof, can generate vibrations that may interfere with and/or obscure detection of vibration patterns indicative of refrigerant leaks. As such, in certain embodiments, the controller 130 operates or maintains the leak management system 102 in idle mode when the HVAC system 100 is in the ON-cycle. When in idle mode, the controller 130 may not receive or collect vibration signals from the vibration sensors 120 indicative of vibrations transmitted from or through the components of the HVAC system 100. Accordingly, for such embodiments, while the controller 130 determines that the HVAC system 100 is in the ON-cycle, the leak management system 102 conserves computing power, energy, and/or sensor life by operating in idle mode, wherein vibrations present in or around components of the HVAC system 100 are not collected by the vibration sensor 120 or analyzed by the controller 130. However, in other embodiments, the controller 130 may receive and/or store the signals from the vibration sensors 120 during the ON-cycle of the HVAC system 100 without analyzing the signals, thus conserving processing or computing power.

Additionally, for such embodiments, when the HVAC system 100 is switched to the OFF-cycle, such as when the compressor 74 is deactivated or when fans 64 and 66 are deactivated, the controller 130 may instead operate the leak management system 102 in active detection mode. In active detection mode, the controller 130 monitors or collects the vibrations produced by the HVAC system 100. For example, in response to determining that the HVAC system 100 is in the OFF-cycle, the controller 130 instructs the vibration sensors 120 to transmit signals to the controller 130 indicative of vibrations from the HVAC system 100. As illustrated in the embodiment of FIG. 5, when disposed near the evaporator 80, it is presently recognized that the vibration sensor 120 is closer to a greater quantity of braze or solder joints or potential leak points for the refrigerant 106, thus enhancing detection of refrigerant leaks within the HVAC system 100. The vibration sensor 120 is near the evaporator 80 when the vibration sensor 120 is proximate to, adjacent to, within inches of, in contact with, coupled to, integral with the evaporator 80. In different embodiments, the evaporator 80 may be one or more of a bare tube evaporator, a plate surface evaporator, a finned evaporator, a flooded type evaporator, a dry expansion type evaporator, a forced convection type evaporator, or a natural convection type evaporator, in accordance with the present disclosure. Additionally, in certain embodiments having multiple vibration sensors 120, the controller 130 is capable of locating a position of a refrigerant leak within the refrigeration circuit 72 via the signals received from the multiple vibration sensors 120, as discussed in more detail below with reference to FIG. 6.

Indeed, in active detection mode, the controller 130 receives the signals from the vibration sensors 120 indicative of vibration patterns near the HVAC components. Then, the controller 130 determines the vibration patterns based on the signals from the vibration sensors 120. For example, the vibration patterns may be indicative of vibrations that are present within the HVAC system 100, or the vibration patterns may be indicative of silence or no vibrations present above a sensor sensitivity threshold.

Additionally, the illustrated controller 130 is capable of processing, such as filtering vibration patterns to remove background vibrations not indicative of a refrigerant leak. For example, in certain embodiments, the controller 130 may use a low-pass filter, a high-pass filter, or a band-pass filter to isolate or remove a target range of frequencies within a vibration pattern. Accordingly, in certain embodiments, the controller 130 includes or is communicatively coupled to a digital signal processor (DSP). Further, the controller 130 may employs a fast Fourier transform (FFT) algorithm to convert the vibration pattern from a mixture of various vibrations into individual resolved peaks, as discussed in more detail below with reference to FIGS. 7A and 7B below. In this manner, the controller 130 processes and transforms the vibration pattern into a processed vibration pattern. In other embodiments, the controller 130 may perform any other suitable signal processing in addition or in alternative to the processing described herein.

Subsequently, the controller 130 determines whether the processed vibration pattern is indicative of a refrigerant leak. For example, as discussed above, in certain embodiments, the trained machine learning module 138 of the controller 130 determines a probability that the processed vibration pattern is indicative of a refrigerant leak. For such embodiments, the controller 130 may determine that a refrigerant leak is occurring when the probability value generated by the machine learning module 138 is greater than a predetermined threshold. In other embodiments, the controller 130 may determine whether a refrigerant leak is present by comparing the processed vibration pattern to one or more predetermined vibration patterns stored in the memory 134 of the controller 130, wherein the predetermined vibration patterns are indicative of a refrigerant leak. When the processed vibration pattern does not correspond to or substantially match a vibration pattern indicative of a refrigerant leak, the controller 130 determines that a refrigerant leak is not present. In some embodiments, the controller 130 thus continues to operate the leak management system in active detection mode to continue to receive and process vibration patterns to monitor whether a refrigerant leak is present. In some embodiments, the controller 130 and the vibration sensor 120 may also wait a predefined time threshold before enabling redetermination of whether the HVAC system 100 includes a vibration pattern indicative of a refrigerant leak, thus limiting power consumption and enhancing a useable life of the vibration sensor 120.

In response to determining that a refrigerant leak is present within the HVAC system 100, the controller 130 enters leak response mode to perform suitable control actions to manage the detected leak of the refrigerant 106. In leak response mode, the controller 130 provides one or more instructions, such as any suitable control signals or requests to a master controller modifying operation of the HVAC system 100. In some embodiments, the control signals prompt the HVAC system 100 to provide alerts and/or to take corrective action in response to a detected refrigerant leak. For example, the controller 130 may transmit the control signal to instruct a device, such as a thermostat, a user device, and/or a service technician workstation, to generate an alert indicative of the detected refrigerant leak. For example, the alert may include instructions to deactivate activation sources, instructions to instruct users to perform any suitable actions, and/or a determined location of the leak within the HVAC system 100 to enable a technician to find to make an informed repair of the HVAC system 100. Once informed of the detected refrigerant leak, users may perform manual control actions, such as shutting off the HVAC system 100 or repairing a portion of the evaporator 80, in response to the detected refrigerant leak. Additionally, the control signals from the controller 130 may cause the HVAC system 100 to pump and confine the refrigerant 106 to a particular portion of the HVAC system 100, such as a particular portion of the HVAC system 100 away from the refrigerant leak, cause the HVAC system 100 to dilute the refrigerant leak from the HVAC system 100, or a combination thereof.

Moreover, in some embodiments, the controller 130 in leak response mode, or the controller 130 in leak detection mode, may further analyze the processed vibration pattern to determine attributes, qualities, features, or details of the refrigerant leak. For example, the controller 130 may identify a component from which the refrigerant 106 is leaking and/or physical properties of the refrigerant leak. In certain embodiments, in addition to outputting the probability of a refrigerant leak, the machine learning module 138 may provide an indication of a particular location of the HVAC system 100 that is likely to be the source of the leak, based on the aforementioned training. Additionally, in certain embodiments, the attributes of the refrigerant leak are determinable based on relative amplitudes or signal strengths of vibrations of the processed vibration patterns, such that the controller 130 determines that the refrigerant leak is more likely to be located closer to a vibration sensor 120 that receives the vibration pattern with greater average or maximum amplitudes, compared to a vibration sensor 120 that receives the vibration pattern with lesser average or maximum amplitudes. In other words, by employing an array of vibration sensors 120 within the HVAC system 100, the controller 130 is capable of determining a location of a refrigerant leak with a resolution of meters, yards, feet, inches, etc. based on a density or amount of vibration sensors 120 included in the array of vibration sensors 120.

Figure 6:
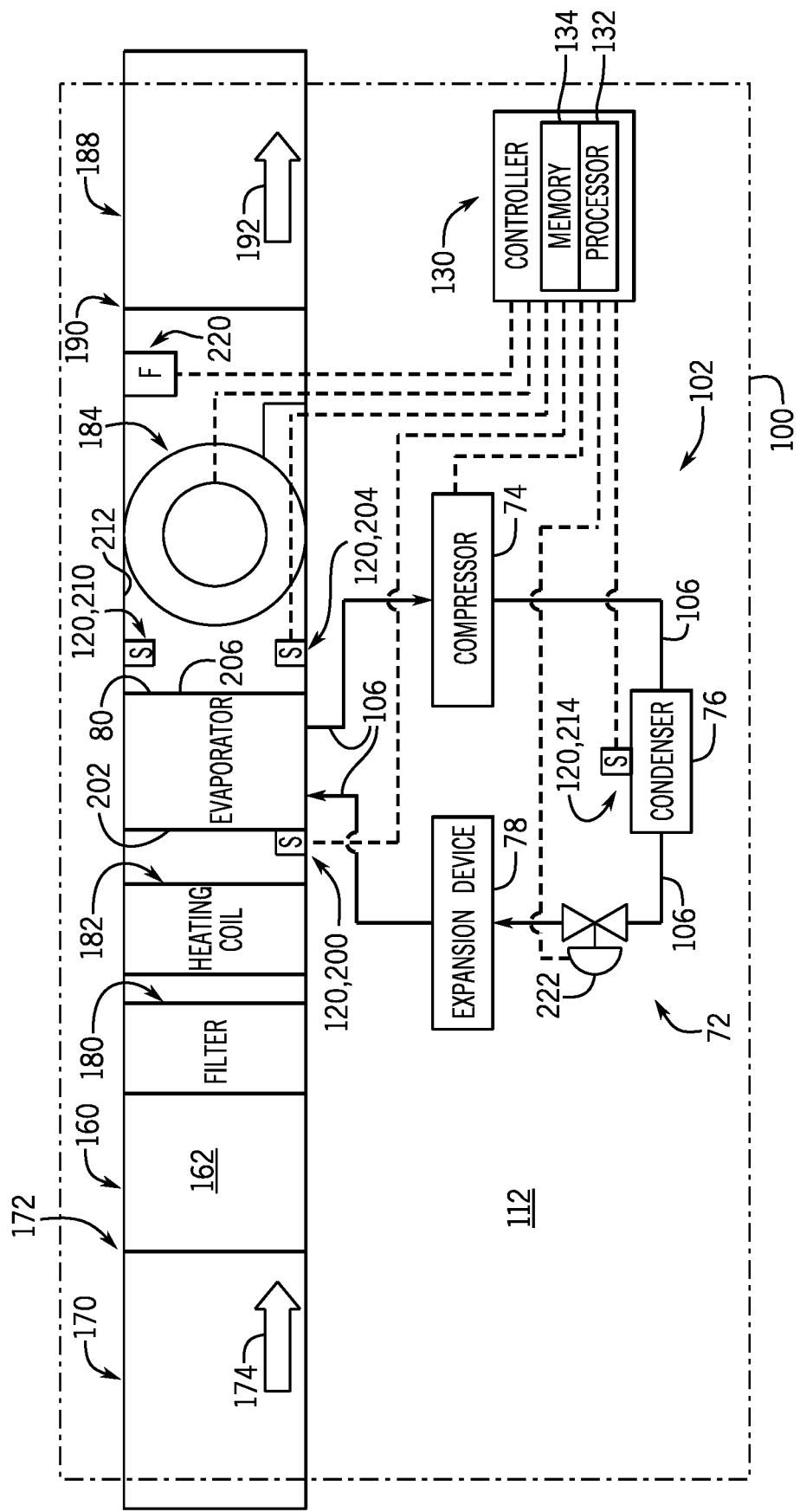
FIG. 6 is a schematic diagram of an embodiment of a portion of the leak management system of FIG. 5, in accordance with present techniques.

FIG. 6 is a schematic diagram of an embodiment of an enclosure 160, such as an air handling enclosure of the HVAC system 100. The illustrated embodiment of the HVAC system 100 includes the leak management system 102, and the refrigeration circuit 72 having the compressor 74, condenser 76, expansion device 78, and evaporator 80, as discussed above. Additionally, the evaporator 80 is disposed within the enclosure 160, which is a structurally sound or tough container or box having walls that fluidly isolate an interior 162 of the enclosure 160 from the exterior environment 112. Moreover, in certain embodiments, the enclosure 160 is disposed in an attic, in a supply or utility room, on a roof or wall of the building 10, or in another suitable location to enable conditioning the interior space of the building 10.

As illustrated, the enclosure 160 includes a return inlet duct 170 fluidly coupled to a return inlet 172 of the enclosure 160 that receives an unconditioned airflow 174 from the interior space of the building 10. In the embodiment illustrated in FIG. 6, the unconditioned airflow 174 travels through multiple components within the enclosure 160 to be conditioned. For example, the unconditioned airflow 174 travels through a filter 180 that removes particulates, dust, bacteria, or other undesired matter within the unconditioned airflow 140. Additionally, the unconditioned airflow 174 travels through a heating coil 182 that may heat the unconditioned airflow 174 to remove humidity or otherwise modify or condition the unconditioned airflow 174. Moreover, the unconditioned airflow 174 exchanges heat with the surface of the evaporator 80, which cools the unconditioned airflow 174 and/or removes humidity from the unconditioned airflow 174 by enabling heat transfer between the refrigerant 106 and the unconditioned airflow 174. Further, when actuated, a supply fan 184 receives the unconditioned airflow 140, and moves the unconditioned airflow 174 at an increased speed and/or flowrate out of a supply outlet duct 188 fluidly coupled to a supply outlet 190 of the enclosure 160. The unconditioned airflow 174 is therefore conditioned and transformed into a conditioned airflow 192 that is sent to condition the interior space of the building 10 having the HVAC system 100.

Further, the embodiment of the leak management system 102 illustrated in FIG. 6 includes vibration sensors 120 that are distributed throughout the HVAC system 100. Indeed, in the illustrated embodiment of FIG. 6, a first vibration sensor 200 is disposed on or embedded in a first side 202 of the evaporator 80, and a second vibration sensor 204 is disposed on or embedded in a second portion 206 of the evaporator 80. Additionally, a third vibration sensor 210 is near an upper portion 212 of the enclosure 160, and a fourth vibration sensor 214 is near the condenser 76. Thus, each vibration sensor 120 is capable of detecting vibrations within a sensing range, and transmitting signals representative thereof to the controller 130. In some embodiments, the sensing range is any suitable distance between two components, such as components within 1 mm, 5 mm, 10 mm, 50 mm, 100 mm, 200 mm, 500 mm, 1 m, etc. of each other. As such, the plurality of vibration sensors 120 operates as an array that may cooperate to monitor vibrations throughout the HVAC system 100 to enable detection and mitigation of refrigerant leaks therein.

For embodiments that include an array of vibration sensors 120, in addition to determining the presence of a refrigerant leak, the controller 130 may also determine a location of a refrigerant leak. By way of an example, in certain embodiments, the first vibration sensor 200 and the second vibration sensor 204 may be accelerometers, and the third vibration sensor 210 and the fourth vibration sensor 214 may be electronic microphones. For such embodiments, when the evaporator 80 leaks, the first, second, and third vibration sensors 200, 204, 210 sense vibrations of a greater amplitude than the fourth vibration sensor 214, which is proximate the condenser 76. Additionally, when the leak instead occurs on the first side 202 of the evaporator 80, the first vibration sensor 200 senses vibrations of a greater amplitude than the second vibration sensor 204. As such, in certain embodiments, the controller 130 can analyze the relative amplitudes of vibration patterns detected by the various vibration sensors 120 to determine a location of the refrigerant leak. In such embodiments, the controller 130 can store the location of the refrigerant leak in the memory 134 and/or or provide the location of the refrigerant leak with alerts indicative of the refrigerant leak to enable a service technician to make more informed and effective repairs.

After detecting a refrigerant leak, the controller 130 operating in the leak response mode as discussed with reference to FIG. 5 may respond to take corrective action to address the refrigerant leak by various processes. For example, when the controller 130 determines that the evaporator 80 is the source of the refrigerant leak, the controller 130 may transmit control signals to instruct an exhaust fan 220 embedded within the enclosure 160 to vent fluid including air and the leaked refrigerant 106 from the enclosure 160. Additionally or alternatively, the controller 130 may transmit control signals to a control valve 222 to instruct the control valve 222 to close, thus blocking or stopping a flow of the refrigerant 106 to the evaporator 80. In other embodiments, the leak management system 102 performs two or more of the above control actions simultaneously. In still other embodiments, the controller 130 may take a first action when the machine learning module 138 determines a probability of a refrigerant leak that is greater than a first threshold value, and may later additionally perform a second, more aggressive action when the machine learning module 138 determines a probability of a refrigerant leak is greater than a second threshold value that is greater than the first threshold value. Additionally, other corrective actions instigated by the controller 130 in response to the refrigerant leak include disabling operation of the HVAC system 100 and preventing, the HVAC system 100 from switching to ON-cycle until after the detected refrigerant leak is repaired. In some embodiments, the controller 130 recognizes that the detected refrigerant leak is repaired based on user input received from a user device indicative of the completed repair.

Figure 7A:
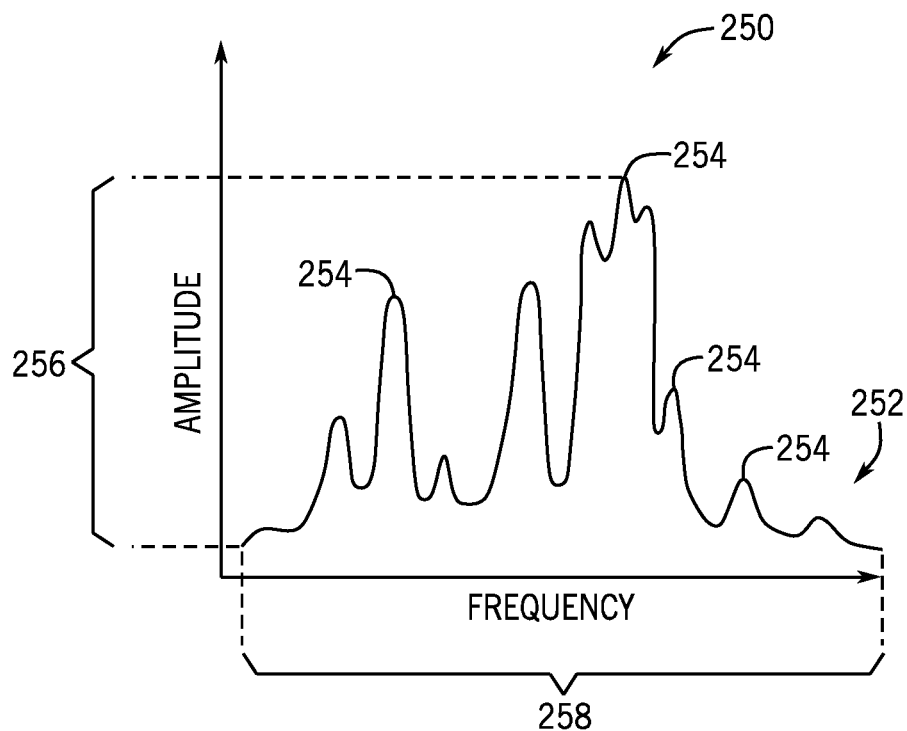
FIG. 7A is a graphical view of an embodiment of an unprocessed vibration pattern of the leak management system of FIG. 5, in accordance with present techniques.

Looking now to an example of a vibration pattern and a processed vibration pattern, FIG. 7A is a graphical representation 250 of an embodiment of an unprocessed vibration pattern 252 that includes a mixture of background vibrations and vibrations associated with a refrigerant leak, shown as a function of amplitude versus frequency. For example, the background vibrations may be vibrations that correspond to planes, trains, cars, animals, people, weather, etc. The unprocessed vibration pattern 252 includes a plurality of peaks 254 that include respective amplitudes that span across an amplitude range 256, and respective frequencies that span across a frequencies range 258. As discussed above, the unprocessed vibration pattern 252 is captured by a vibration sensor 120 of the leak management system 102 in leak detection mode, and may correspond to any suitable macroscopic and/or visible vibrations or microscopic and/or acoustic vibrations. As such, the frequency range may include any suitable range that is detectable by vibration sensors, including any range from 0 hertz to 10 kilohertz, 20 kilohertz, 30 kilohertz, 40 kilohertz, and above. Signals having an amplitude that is less than a particular threshold may be filtered or removed from the unprocessed vibration pattern 252. Additionally, the amplitude range may be normalized such that the amplitude range spans from 0 to 1, may be represented in decibels, etc. However, it is to be understood that vibrations having greater amplitudes have greater power and/or are generally closer to the respective vibration sensor 120 than other vibrations having lower amplitudes.

Figure 7B:
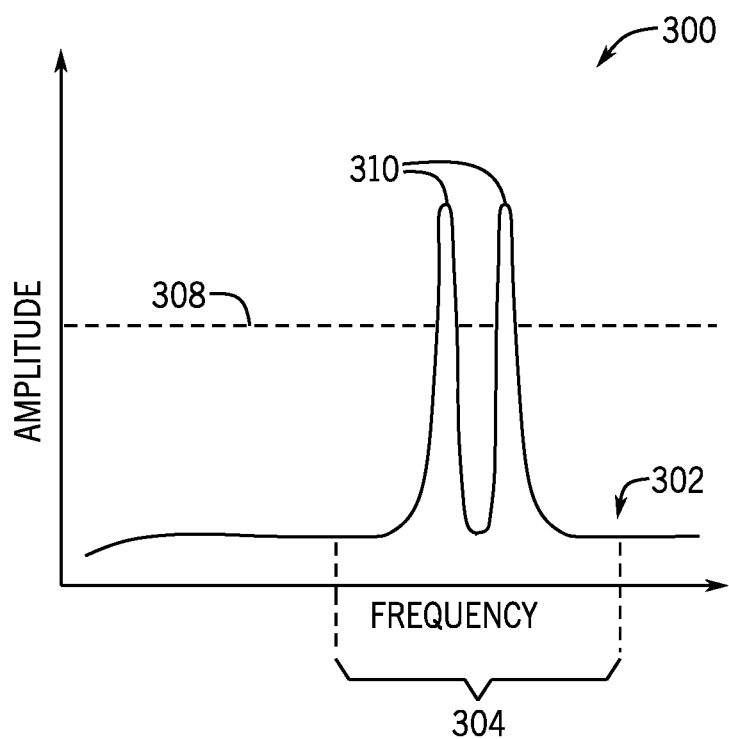
FIG. 7B is a graphical view of an embodiment of a processed vibration pattern of the unprocessed vibration pattern of FIG. 7A, in accordance with present techniques.

Further, FIG. 7B is a graphical representation 300 of an embodiment of a processed vibration pattern 302, shown as a function of amplitude vs frequency. The processed vibration pattern 302 corresponds to a processed version of the unprocessed vibration pattern 252. For example, the controller 130 processes the unprocessed vibration pattern 252 to remove non-leak related or background vibrations. Indeed, in the illustrated embodiment, the processed vibration pattern 302 has been processed by the controller 130 using a band-pass filter to isolate a target frequency range 304 within the processed vibration pattern 302. Additionally, the processed vibration pattern 302 does not include the peaks 254 of the unprocessed vibration pattern 252 having an amplitude below an amplitude threshold 308 because of an amplitude filter also applied by the controller 130. As such, the controller 130 has isolated the remaining peaks 254 of the unprocessed vibration pattern 252 into the resolved peaks 310 illustrated in FIG. 7B. The controller 130 may use the processed vibration pattern 302 to compare to leak vibration patterns stored in the memory 134, or may provide the processed vibration pattern 302 as input to the trained machine learning module 138 to determine a probability of a refrigerant leak, as discussed above, enabling acoustic refrigerant leak detection within the HVAC system 100.

Figure 8:
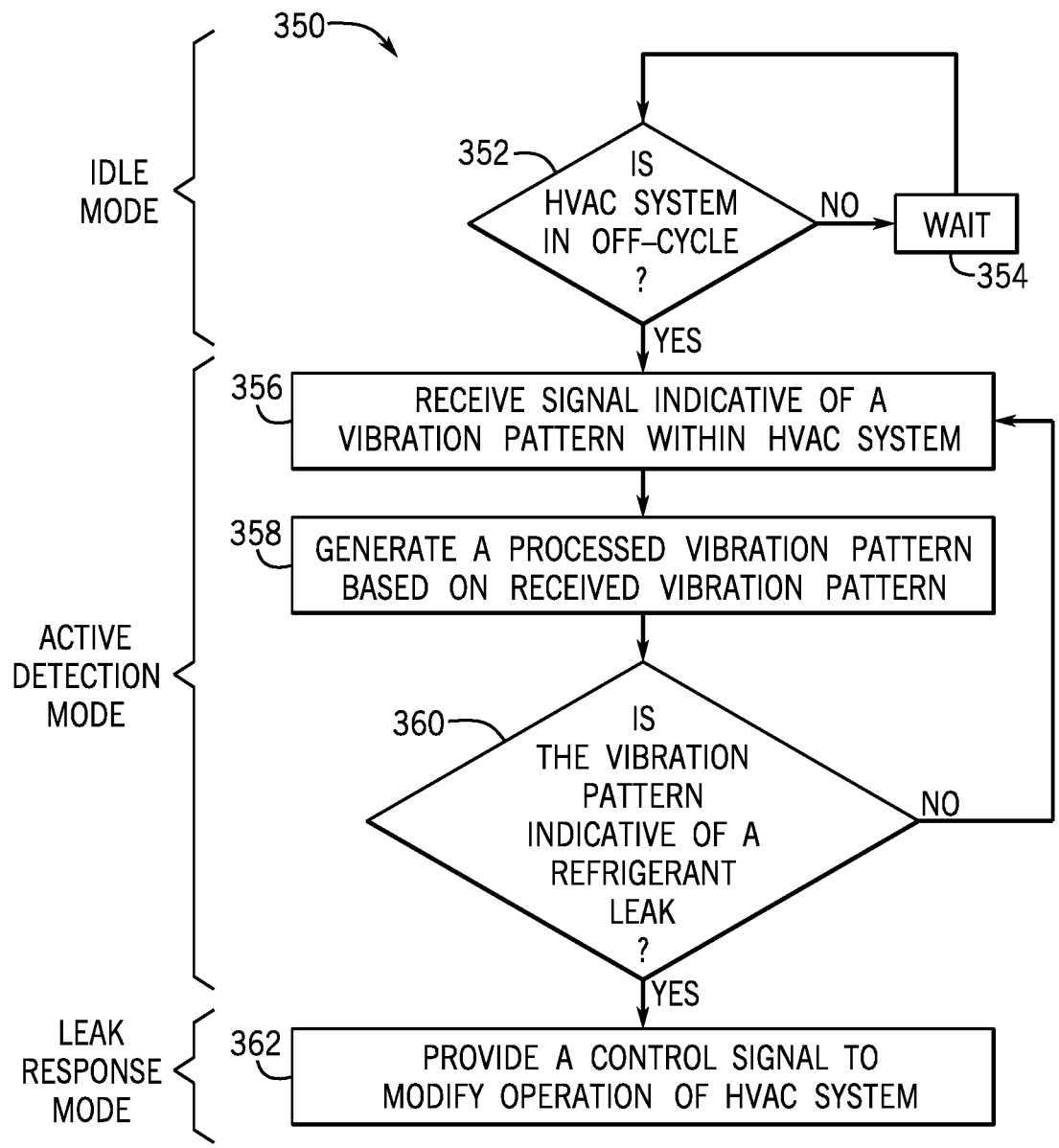
FIG. 8 is a flow diagram representing an embodiment of a process of operating the leak management system of FIG. 5, in accordance with present techniques.

FIG. 8 is a flow diagram illustrating an embodiment of a process 350 for operating the leak management system 102 of FIG. 5. It is to be understood that the steps discussed herein are merely exemplary, and certain steps may be omitted or performed in a different order that the order discussed herein. The process 350 may be performed by the controller 130, such as the HVAC controller or a separate controller communicatively coupled to the HVAC controller.

The illustrated process 350 begins with the controller 130 determining, as indicated in block 352, whether the HVAC system 100 is in OFF-cycle. As discussed previously, the HVAC system 100 is in the OFF-cycle when the compressor 74 is deactivated, such that the refrigerant 106 is not being actively driven through the refrigeration circuit 72. In embodiments in which the controller 130 is the HVAC controller or another suitable master controller, the controller 130 may receive suitable signals indicating when the HVAC system 100 changes between ON-cycle and OFF-cycle operation. Additionally, in certain embodiments in which the controller 130 is communicatively coupled to the HVAC controller, the controller 130 may request that the HVAC controller provide the controller 130 with the current cycle of the HVAC system 100. For the illustrated embodiment, in response to determining at block 352 that the HVAC system 100 is not in the OFF-cycle, the controller 130 waits, as indicated in block 354, a predefined amount of time before again determining whether the HVAC system 100 is in OFF-cycle. Thus, when the leak management system 102 is in idle mode, the controller 130 waits for the HVAC system 100 to complete the conditioning cycle before receiving, processing, and analyzing vibration patterns. In other embodiments, the leak management system 102 may not include or operate in an idle mode. In such embodiments, the controller 130 of the leak management system 102 may be continuously operated to acoustically detect refrigerant leaks, even when the HVAC system 100 is in ON-cycle.

In response to determining, at block 352, that the HVAC system 100 is in the OFF-cycle, the leak management system 102 may begin operating in active detection mode. For the illustrated embodiment, in active detection mode, the controller 130 of the leak management system 102 receives a signal indicative of a measured vibration pattern within the HVAC system 100, as indicated in block 356. The vibration sensors 120 are disposed on or near components of the HVAC system 100, such as the conduits 110, the evaporator 80, the condenser 76, etc., and thus transmit the signals indicative of the vibration pattern to the controller 130. Indeed, the vibration sensors 120 may transmit the signals continuously, at regular intervals, or in response to detecting a change in the vibrations respectively proximate each vibration sensor 120.

Continuing through the illustrated process 350, the controller 130 generates a processed vibration pattern by modifying portions of the unprocessed vibration pattern, as indicated in block 358. As discussed above, the controller 130 may generate the processed vibration pattern by applying one or more filters to the signal received from the vibration sensor 120. In certain embodiments, the processing of block 358 may be skipped and the unprocessed vibration pattern may be used in the following steps of the process 350.

Next in the illustrated process 350, the controller 130 determines whether the vibration pattern is indicative of a refrigerant leak, as indicated in block 360. For example, as set forth above, the controller 130 may provide the processed vibration pattern from block 358 to the machine learning module 138, and the machine learning module 138 may provide an output value that represents a probability that the vibration pattern is indicative of a refrigerant leak. For such embodiments, the controller 130 may determine that the processed vibration pattern is indicative of the refrigerant leak when the determined probability is greater than a predetermined threshold value. In other embodiments, the controller 130 may compare the processed vibration pattern to one or more vibration patterns stored in the database 136 or the memory 134 of the controller 130, and determine that a refrigerant leak is present in the HVAC system 100 when a substantially similar signal is located. In response to determining at block 360 that the vibration pattern does not correspond to a refrigerant leak, the controller 130 returns to block 356 to continue receiving the signal indicative of the vibration pattern associated with the component in the active detection mode.

However, in response to determining at block 360 that the vibration pattern does correspond to a refrigerant leak in the HVAC system 100, the leak management system 102 may begin operating in leak response mode. Accordingly, in leak response mode, the controller 130 provides control signals to modify operation of the HVAC system 100 to address the refrigerant leak, as indicated in block 362. Indeed, as mentioned, the control signals may include transmitting an alert indicative of the refrigerant leak, disabling operation of the HVAC system 100, pumping and confining the refrigerant 106 to a particular portion of the HVAC system 100, diluting the refrigerant leak in the HVAC system 100, or a combination thereof.

Accordingly, the present disclosure is directed to a leak management system for mitigating leaks of a refrigerant that are acoustically detected within a HVAC system. The leak management system includes one or more vibration sensors capable of detecting vibrations within the HVAC system, such as vibration patterns measured within the air or through components of the HVAC system. A HVAC controller processes and analyzes the vibration patterns to determine whether they correspond to vibration patterns associated with a refrigerant leak. In response to identifying vibration patterns that correspond to a leak of refrigerant, the controller modifies operation of the HVAC system and/or the leak management system to address the refrigerant leak. For example, the controller may provide control signals to activate an exhaust fan, to cause a device to transmit an alert indicative of the concentration of the refrigerant, to activate a separate sensing mechanism for confirmation, and/or to stop operation of the HVAC system until the leak of refrigerant is resolved. In this manner, the leak management system enables the acoustic detection and prompt mitigation of refrigerant leaks substantially before the leaked refrigerant reaches a threshold concentration.

While only certain features and embodiments of the present disclosure have been illustrated and described, many modifications and changes may occur to those skilled in the art, such as variations in sizes, dimensions, structures, shapes and proportions of the various elements, values of parameters including temperatures, pressures, etc., mounting arrangements, use of materials, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described, such as those unrelated to the presently contemplated best mode of carrying out the disclosure, or those unrelated to enabling the claimed features. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A refrigerant leak management system, comprising:
a controller communicatively coupled to a sensor disposed on an outer surface of a component within a heating, ventilation, and air conditioning (HVAC) system, wherein the controller is configured to:
measure a vibration pattern corresponding to the component using the sensor, wherein the vibration pattern is measured as an acoustic wave propagating from the outer surface of the component;
determine a probability that the vibration pattern is indicative of a refrigerant leak in the HVAC system; and
modify operation of the HVAC system by:
performing an initial control action in response to the probability being greater than a first threshold value; and
performing an escalated control action in response to the probability being greater than a second threshold value, wherein the second threshold value is greater than the first threshold value.

2. The refrigerant leak management system of claim 1, wherein, before determining the probability that the vibration pattern is indicative of the refrigerant leak, the controller is configured to:
process the vibration pattern corresponding to the component of the HVAC system via a filter to remove a predetermined vibration pattern associated with normal operation of the component.

3. The refrigerant leak management system of claim 1, wherein the controller is configured to measure an additional vibration pattern using an additional sensor disposed near the component, and wherein the additional vibration pattern is measured as an additional acoustic wave propagating through air.

4. The refrigerant leak management system of claim 1, wherein the sensor comprises a microphone.

5. The refrigerant leak management system of claim 1, wherein the sensor comprises an accelerometer.

6. The refrigerant leak management system of claim 1, wherein the component comprises a refrigerant conduit of the HVAC system.

7. The refrigerant leak management system of claim 1, wherein the component comprises an evaporator of the HVAC system.

8. The refrigerant leak management system of claim 1, wherein the controller is configured to modify the operation of the HVAC system by:
transmitting an alert indicative of the probability that the vibration pattern is indicative of the refrigerant leak, disabling the HVAC system, pumping and confining a refrigerant to a particular portion of a refrigeration circuit of the HVAC system, diluting the refrigerant leak within the HVAC system, or a combination thereof.

9. The refrigerant leak management system of claim 1, comprising an additional sensor physically coupled to an additional outer surface of the component, and wherein the controller is configured to determine a refrigerant leak position based on respective signals from the sensor and the additional sensor.

10. The refrigerant leak management system of claim 1, wherein the controller is configured to determine the probability that the vibration pattern is indicative of the refrigerant leak by querying a vibration pattern database to determine whether the vibration pattern corresponds at least in part to a predetermined vibration pattern stored in the vibration pattern database.

11. The refrigerant leak management system of claim 10, wherein the predetermined vibration pattern stored in the vibration pattern database is based on experimental operations comprising circulating a refrigerant within a test HVAC system that is substantially similar to the HVAC system.

12. The refrigerant leak management system of claim 1, wherein the controller is configured to apply a filter to the vibration pattern to isolate a target frequency range within the vibration pattern before determining the probability that the vibration pattern is indicative of the refrigerant leak.

13. The refrigerant leak management system of claim 1, wherein the controller comprises a processor configured to execute a machine learning module, and wherein the controller is configured to:
provide the vibration pattern to the machine learning module; and
receive the probability that the vibration pattern is indicative of the refrigerant leak from the machine learning module.

14. A refrigerant leak management system of a heating, ventilation, and air conditioning (HVAC) system, comprising:
a sensor configured to detect a vibration pattern of an evaporator; and
a controller communicatively coupled to the sensor and configured to:

receive a signal from the sensor indicative of the vibration pattern of the evaporator;

determine, based on the signal, a correspondence between whether the vibration pattern and a reference vibration pattern, wherein the correspondence is indicative of a likelihood of a refrigerant leak from the evaporator; and modify operation of the HVAC system by:
performing an initial control action in response to the correspondence between the vibration pattern and the reference vibration pattern being greater than a first threshold value; and
performing an escalated control action in response to the correspondence between the vibration pattern and the reference vibration pattern being greater than a second threshold value, wherein the second threshold value is greater than the first threshold value.

15. The refrigerant leak management system of claim 14, wherein, before determining, based on the signal, the correspondence between whether the vibration pattern and the reference vibration pattern, the controller is configured to:
process the signal indicative of the vibration pattern of the evaporator via a filter to remove a predetermined vibration pattern associated with normal operation of the HVAC system.

16. The refrigerant leak management system of claim 14, wherein the evaporator comprises a bare tube evaporator, a plate surface evaporator, a finned evaporator, a flooded type evaporator, a dry expansion type evaporator, a forced convection type evaporator, a natural convection type evaporator, or a combination thereof.

17. The refrigerant leak management system of claim 14, comprising an array of sensors including the sensor, wherein the array of sensors is distributed about the HVAC system, wherein the array of sensors is configured to detect a plurality of vibration patterns including the vibration pattern, and wherein the controller is configured to:
receive a plurality of signals from the array of sensors including the signal from the sensor, the plurality of signals being indicative of the plurality of vibration patterns including the vibration pattern.

18. The refrigerant leak management system of claim 17, wherein the controller is configured to:
determine a refrigerant leak location based on the plurality of signals; and
modify the operation of the HVAC system based on the refrigerant leak location.

19. A method of operating a refrigerant leak management system of a heating, ventilation, and air conditioning (HVAC) system, comprising:
generating a plurality of vibrations in the HVAC system by routing a refrigerant through the HVAC system;
measuring a plurality of vibration patterns corresponding to the plurality of vibrations using a plurality of sensors disposed near a refrigeration circuit of the HVAC system, wherein the plurality of sensors comprises a sensor disposed on an outer surface of a component of the HVAC system, and wherein the sensor measures a vibration pattern of the plurality of vibration patterns, the vibration pattern corresponding to the component;

determining a probability that the vibration pattern of the plurality of vibration patterns is indicative of a refrigerant leak from the refrigeration circuit;
determining that the probability is greater than a first threshold value;
determining that the probability is greater than a second threshold value, wherein the second threshold value is greater than the first threshold value; and
modifying operation of the HVAC system by:
performing an initial control action in response to determining that the probability is greater than the first threshold value; and
performing an escalated control action in response to determining that the probability is greater than the second threshold value.

20. The method of claim 19, comprising, in response to determining that the HVAC system is on:
querying a vibration pattern database to identify at least one predetermined vibration pattern associated with normal operation of the HVAC system; and
processing the plurality of vibration patterns to remove the at least one predetermined vibration pattern associated with normal operation of the HVAC system before determining the probability that the vibration pattern is indicative of the refrigerant leak.

21. The method of claim 19, comprising switching the HVAC system off before measuring the plurality of vibration patterns.

22. The method of claim 19, wherein measuring the plurality of vibration patterns comprises measuring an additional vibration pattern of the plurality of vibration patterns as it propagates through air.

23. The method of claim 19, wherein the component comprises a refrigerant conduit, an evaporator, or a condenser of the HVAC system.

24. The method of claim 19, comprising applying a filter to each vibration pattern of the plurality of vibration patterns to remove portions of the plurality of vibration patterns before determining the probability that the vibration pattern is indicative of the refrigerant leak.

25. The method of claim 24, wherein the filter comprises a low-pass filter, a high-pass filter, or a band-pass filter.

26. The method of claim 19, wherein determining the probability that the vibration pattern is indicative of the refrigerant leak comprises:
sending the vibration pattern to a machine learning module executable by a processor; and
receiving the probability from the machine learning module.

27. The refrigerant leak management system of claim 1, wherein the sensor comprises a microphone configured to detect microscopic vibrations, and wherein the refrigerant leak management system comprises an accelerometer configured to detect macroscopic vibrations.

28. The refrigerant leak management system of claim 1, wherein the escalated control action comprises:
disabling a compressor of the HVAC system, pumping and confining a refrigerant to a particular portion of a refrigeration circuit of the HVAC system, or a combination thereof.

* * * * *